United States Patent Office 3,373,795
Patented Mar. 19, 1968

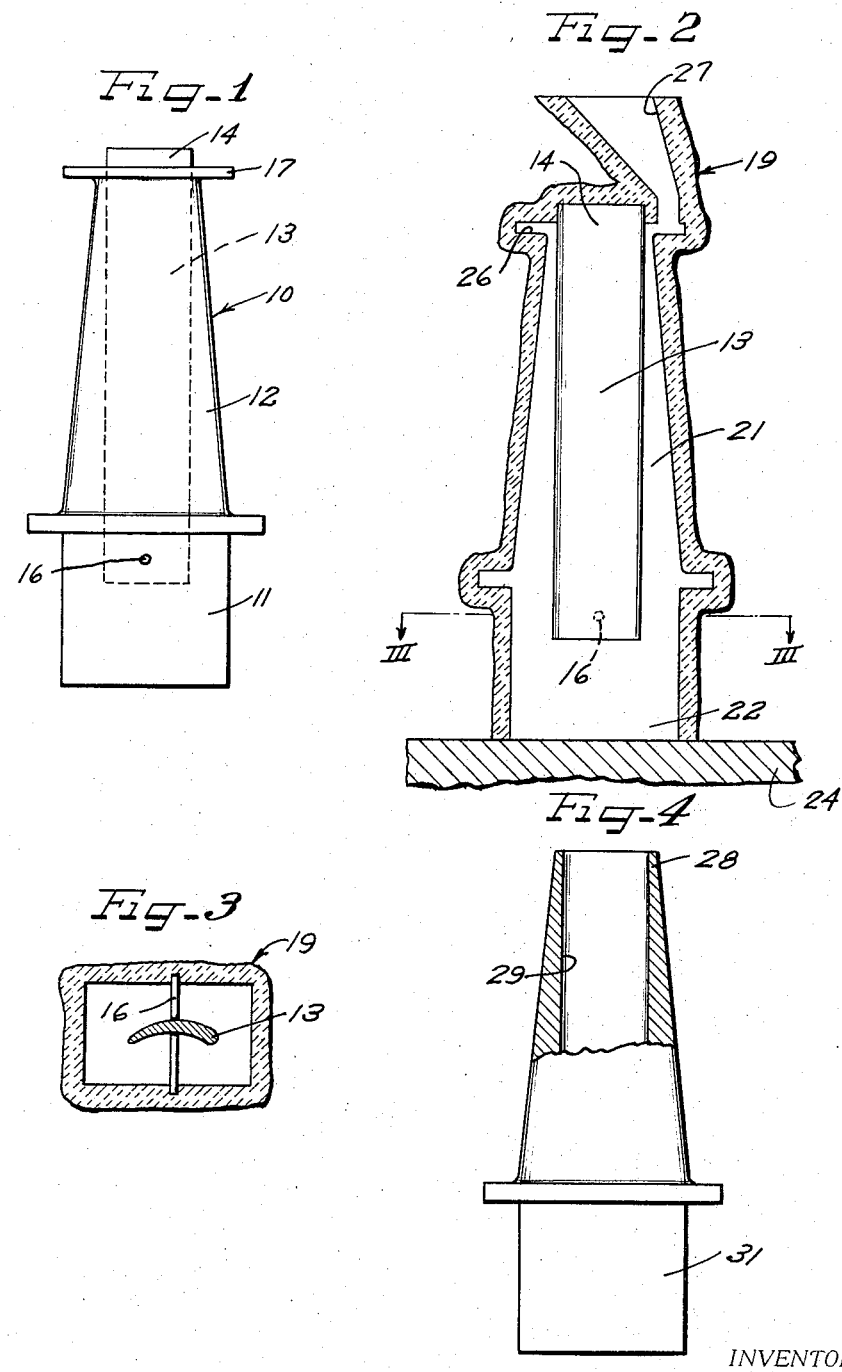

3,373,795
GATING OF UNSHROUDED AIRFOILS TO PERMIT DIRECTIONAL SOLIDIFICATION
Frank J. Hein, East Rochester, Ohio, assignor to TRW Inc., Cleveland, Ohio, a corporation of Ohio
Filed Aug. 10, 1965, Ser. No. 478,710
2 Claims. (Cl. 164—359)

ABSTRACT OF THE DISCLOSURE

Mold assembly for producing a casting having a directional grain orientation extending from a relatively massive base to a tip of relatively small cross-section, the mold having a reservoir cavity above the tip-forming end of the casting cavity into which molten metal is introduced, the reservoir improving the feeding of molten metal into the casting cavity.

The present invention relates to improvements in methods and apparatus for producing castings of directional grain orientation, and has particular reference to the manufacture of turbine vanes and the like composed of high temperature alloys.

Relatively recently, there has been a substantial amount of development work relating to the production of columnar castings for articles such as jet engine blades and vanes which are subject to extreme heat and thermal cycling.

Columnar structures are formed by the unidirectional growth of dendrites during solidification. The relationship between the dendritic structure and the columnar grains is not exact. Each columnar grain is usually composed of more than one dendrite, and the number may vary from a few to several hundred. The interdendritic spacing is related to the solidification rate only. Columnar grain size, however, may be affected by factors other than the solidification process, such as ordinary grain growth. Despite these differences, the most convenient approach for the examination of columnar structure formation is through the study of dendrites formed during solidification.

The primary requirement for the formation of a parallel dendritic structure is the presence of a unidirectional thermal gradient. When the metal first enters the mold, the initial solidification occurs at the mold wall due to a chill effect, assuming the mold wall to be below the solidification temperature of the metal. This chill zone consists of many fine dendrites having a random orientation. The initial freezing releases the heat of fusion, resulting in some temperature rise locally, arresting the chill zone formation. At the interface of the chill zone and the melt the dendrites begin to grow into the melt at a rate dependent upon the amount and depth of the supercooling.

Initially, all dendrites at the chill zone-melt interface grow at equal rates, since equal supercooling is present. However, those oriented parallel to the thermal gradient are growing into an area of continued supercooling. Those oriented unfavorably cannot advance as rapidly in the direction of the thermal gradient, since only a component of the growth velocity is aligned with this gradient. The dendrites growing parallel to the gradient, since they have already undergone some growth, will give off a latent heat of fusion, due to the freezing process. This heat of fusion increases the temperature at the base of the dendrites and decreases the amount of supercooling available for growth of the more unfavorably oriented neighbors. In this manner, the growth of the misoriented dendrites is stifled, and only those aligned with the thermal gradient will undergo significant growth.

In the presently preferred process for producing columnar structures, an open ended mold composed of a relatively porous, ceramic material is positioned with its open end situated on a chill block composed of a metal such as copper which has an extremely high thermal conductivity compared to the material of the mold. The mold is then preheated to provide a predetermined temperature gradient, which gradient exists in the molten metal during solidification and provides the desired directional orientation of the columnar grains. In this process, the mold walls are heated to a temperature above the solidification temperature of the metal, thereby causing solidification to be initiated at the surface of the chill block. The cooling of the metal in the mold is of equal importance in securing proper grain structure. In a typical casting procedure, heat is supplied to the mold after pouring, but at a rate which permits cooling of the molten metal to solidification temperatures under the influence of the thermal gradients existing in the mold. This controlled cooling can be accomplished in several ways, one being the selective deenergization of the heat source to provide zones of varying temperature in the mold during solidification. Another consists in physically drawing the molten metal during its solidification through zones of controlled temperatures in order to keep the proper thermal gradients in existence at the liquid-solid interface.

Comparative tests between equiaxed and columnar castings indicate that the columnar casting has marked advantages for certain applications. The high temperature strength and ductility of the columnar structures is generally superior to the equiaxed structure, and may be attributed to the preferential occurrence of gas porosity at grain boundary locations. In the equiaxed structures, the gas porosity is distributed randomly, following a grain boundary pattern. As a result, intergranular fractures occur with low ductility. In the columnar structure, the grain boundaries are oriented parallel to the growth direction. Accordingly, the porosity has little or no influence on ductility. The improvement in ductility can be attributed to several factors. The segregation normally associated with equiaxed grains is reduced by the columnar solidification process. The conditions necessary to form columnar structures are identical to those required for proper feeding. Thus, microshrinkage is almost completely eliminated. The primary reason for improved ductility, however, appears to be the elimination of grain boundaries perpendicular to the stress axis. This prevents the normally brittle intergranular type of fracture, permitting a great amount of deformation to occur prior to failure.

The advantages of columnar grain structures, and methods for their production have been developed and commercially exploited. However, certain types of castings because of their geometry and other limitations require modification of the process described previously. A turbine vane having a relatively massive root portion and a thin vane portion at the tip is one which poses special problems. These problems are substantially complicated when the vane is cored so that the cross-sectional area of the metal of the vane at the tip end is very small. The directional solidification process requires that the casting be fed at the tip end of the airfoil, but the thin wall and the end of the core which protrudes through the tip end of the blade precludes gating the mold in this area in the conventional manner. Attempts to introduce metal into the tip end of the airfoil under these conditions have resulted in a tendency to crack, or more accurately, hot tearing. Furthermore, since the rate of flow of the metal into the casting cavity is severely limited, it may result in non-homogeneous solidification, splashing, and undesirable cooling.

One of the objects of the present invention is to provide an improved casting apparatus particularly designed for the production of columnar structures and providing means for introducing molten metal at an adequate flow rate into a molding cavity having a reduced cross-sectional area at its inlet end.

Another object of the invention is to provide an apparatus for casting columnar structures which permits an adequate flow of metal into the casting cavity even in the presence of a core which occupies much of the inlet area of the casting cavity.

Still another object of the invention is to provide a method for the production of castings of controlled grain orientation which insures adequate filling of the mold without excessive strains being set up in the relatively thin portions of the casting.

Other objects and features of the present invention will become apparent to those skilled in the art from the following detailed description of the attached sheet of drawings which illustrate the improvements of the present invention as they are applied to the casting of a cored turbine vane, although it will be realized that the advantages inherent in the invention will be obtained in casting of other structures whose geometry presents problems similar to those presented by the manufacture of turbine vanes.

In the drawings:

FIGURE 1 is a view in elevation of a wax pattern which can be used for the purposes of the present invention;

FIGURE 2 is a view in section of the ceramic mold assembly produced from the pattern of FIGURE 1;

FIGURE 3 is a cross-sectional view taken substantially along the line III—III of FIGURE 2; and FIGURE 4 is a view in elevation, partly broken away, illustrating the structure of the final casting.

As shown in the drawings:

In FIGURE 1, reference numeral 10 indicates generally a pattern composed of a disposable material such as wax, plastic, or the like. The pattern includes a relatively massive base portion 11 and an arcuate, thin vane portion 12. A ceramic core 13 having a core print 14 extending beyond the pattern is embodied in the pattern to provide the blind ended bore in the finished casting. A ceramic pin 16 is also embodied in the pattern to hold the depending end of the core 13 in proper alignment within the molding cavity, the pin 16 extending beyond the confines of the wax pattern so that it can be supported within the finished mold assembly as illustrated in FIGURE 3.

To provide for the proper introduction of metal into the relatively narrow tip end of the casting cavity, the pattern 10 is provided with a shroud like reservoir forming portion 17 in circumscribing relation to the tip end of the vane portion 12.

While there are a number of ways to form a ceramic type shell mold about the pattern 10, the particularly preferable method is that described in Mellen et al. U.S. Patent No. 2,932,864. Initially, the pattern at room temperature or so is dipped in an aqueous ceramic slurry having a temperature about the same as that of the pattern material to form a refractory layer of a few mils in thickness. A typical slurry may contain ceramic materials such as zirconia, a binder such as colloidal silica, and a thickener and low temperature binder such as methyl cellulose. The initial layer while still wet is then dusted with small particles (40 to 200 mesh) of a refractory glass composition such as that known as "Vycor" which is a finely divided high silicon oxide glass containing about 96% silica and a small amount of boric acid together with traces of aluminum, sodium, iron, and arsenic. The coated pattern can then be suspended on a conveyor moved through a drying oven having a controlled humidity and temperature, wherein the coated pattern is dried adiabatically. When using air at a wet bulb temperature of 75° F., the prime coat can be safely dried by air having a relative humidity of 45 to 55%.

The steps of dipping, dusting, and adiabatic drying are then repeated using air at progresively lower humidities for each suceeding coat. For example, the first two coats can be dried with air having a relative humidity of 45 to 55%. The third and fourth coats can be dried with a relative humidity of 35 to 45%, the fifth and sixth coats with a relative humidity of 25 to 30%, and the last coat with a relative humidity of 15 to 25%.

The first layer is preferably applied to a thickness of 0.005 to 0.020 inch, and the fine refractory particles are dusted onto the wet layer with sufficient force to embed the particles therein. It is preferred that the dusting procedure used provides a dense uniform cloud of fine particles that strike the wet coating with substantial impact force. The force should not be so great, however, as to break or knock off the wet prime layer from the pattern. This process is repeated until a plurality of integrated layers is obtained, the thickness of the layers each being about 0.005 to 0.020 inch.

After the mold is thus built up on the pattern material, the pattern can be removed by placing the same in a conventional steam autoclave operated at temperatures on the order of 300 to 350° F. The pattern material is removed cleanly after a short time in the autoclave, and then the green mold is ready for firing. Typically, firing temperatures on the order of 1500 to 1900° F. are used. The resulting shell molds are hard, smooth, and relatively permeable, and measure on the order of ⅛ to ¼ inch in thickness.

The shell mold which results from the foregoing operation is illustrated at reference numeral 19 in the drawings. It includes a casting cavity having a vane forming portion 21, and a root forming portion 22 of larger cross-sectional area. The core 13 is supported with its core print 14 received in the ceramic material of the mold, and being prevented from lateral movement by the presence of the ceramic pin 16 which bridges the casting cavity near the lower end, as best seen in FIGURE 3 of the drawings. The open end of the mold 19 is disposed on a chill block 24 composed of copper or other metal having a very high thermal conductivity in comparison with the conductivity of the ceramic material making up the mold.

The presence of the shroud like portion 17 in the pattern 10 provides a reservoir 26 in the finished mold structure, the reservoir 26 communicating with a gate 27 into which the molten metal is actually introduced. Thus, when the metal flows through the gate 27, it provides a shelf of liquid metal above the inlet end of the molding cavity, and extending around the periphery of the core 13. Metal then flows radially inwardly and downwardly to fill the molding cavity. The mold 19 is usually preheated to provide a predetermined temperature gradient within the mold, so that as solidification starts immediately upon metal striking the chill plate 24, it proceeds along grain growth lines dictated by the thermal gradients then existing in the mold. The shelf of metal provided in the reservoir 26 insures that the molten metal will be introduced into the casting cavity under a slight static pressure, thereby minimizing the cracking tendency which heretofore existed when the pouring had to be made through relatively small crosssectional areas. The rate of flow of metal into the molding cavity, and particularly into the tip end is sufficiently high to avoid the problems of non-homogeneous solidification, splashing, and undesired cooling frequently encountered in attempting to cast structures of this type.

After the molding cavity has been completely filled, including the reservoir 26, the metal in the mold is cooled under controlled cooling conditions sufficient to provide the requisite thermal gradients at the interface of the solid and molten metal, and thereby building up a grain structure of controlled orientation. At the conclusion of the solidification, the core 13 is removed as by dissolution in a caustic bath, and then the casting is trimmed to produce the type of structure shown in FIGURE 4. The metal solidified in the reservoir 26 is cut off, leaving a thin walled, open ended vane portion 28 having a blind ended bore 29 extending therein to the root portion 31 of the finished casting.

From the foregoing it will be understood that the technique of the present invention provides a convenient means for gating a mold structure which is otherwise difficult to pour, and for minimizing the cracking tendency by reinforcing the thin casting wall at the tip of the casting.

It should be evident that various modifications can be made to the described embodiments without departing from the scope of the present invention.

I claim as my invention:

1. A mold assembly for producing a casting having a directional grain orientation extending from a relatively massive base to a tip having a relatively small cross-section, which comprises a chill block, a relatively porous open ended ceramic mold having a casting cavity therein shaped in conformity with the shape of the casting to be produced, the open end of said mold defining said relatively massive base and being positioned on said chill block, said mold also having a reservoir cavity therein above and in circumscribing relation to the portion of said casting cavity in which said tip is formed and forming an extension of the casting cavity, and gating means for introducing molten metal directly into said reservoir cavity only, said reservoir cavity having a substantially larger cross-sectional area than the area of said tip and functioning to introduce molten metal into the tip end of said casting cavity under static pressure to thereby increase the rate of introduction of said molten metal into said casting cavity.

2. The mold assembly of claim 1 in which said assembly also includes a ceramic core extending through the portion of the casting cavity in which said tip is formed.

References Cited

UNITED STATES PATENTS

| 2,147,880 | 2/1939 | Campbell | 164—359 |
| 3,314,116 | 4/1967 | Wittmoser et al. | 164—360 |
| 1,103,039 | 7/1914 | Cudell | 249—105 |
| 2,835,007 | 5/1958 | Hoefer | 164—363 |
| 3,204,303 | 9/1965 | Chandley | 164—361 |

FOREIGN PATENTS 410,204  2/1925  Germany.

J. SPENCER OVERHOLSER, *Primary Examiner.*

R. D. BALDWIN, *Assistant Examiner.*